US010964028B2

(12) United States Patent
Syu et al.

(10) Patent No.: US 10,964,028 B2
(45) Date of Patent: Mar. 30, 2021

(54) ELECTRONIC DEVICE AND METHOD FOR SEGMENTING IMAGE

(71) Applicant: Chiun Mai Communication Systems, Inc., New Taipei (TW)

(72) Inventors: Nai-Sheng Syu, New Taipei (TW); Chun-Hsiang Huang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 22 days.

(21) Appl. No.: 16/581,874

(22) Filed: Sep. 25, 2019

(65) Prior Publication Data

US 2020/0151883 A1 May 14, 2020

(30) Foreign Application Priority Data

Nov. 8, 2018 (CN) .......................... 201811327697.8

(51) Int. Cl.
*G06T 7/194* (2017.01)
*G06T 7/593* (2017.01)
*G06T 7/136* (2017.01)

(52) U.S. Cl.
CPC .............. *G06T 7/194* (2017.01); *G06T 7/136* (2017.01); *G06T 7/593* (2017.01)

(58) Field of Classification Search
CPC ......... G06T 7/194; G06T 7/593; G06T 7/136; G06T 7/11

USPC .......................................................... 382/171
See application file for complete search history.

(56) References Cited

U.S. PATENT DOCUMENTS

| 9,070,004 | B2 * | 6/2015 | Liu | G06K 9/0014 |
| 2014/0126818 | A1 * | 5/2014 | Wei | G06T 7/215 |
| | | | | 382/171 |
| 2019/0347767 | A1 * | 11/2019 | Yang | G06K 9/3233 |

FOREIGN PATENT DOCUMENTS

| CN | 107369159 A | 11/2017 |
| CN | 104243820 B | 2/2018 |

\* cited by examiner

*Primary Examiner* — Ayodeji O Ayotunde
(74) *Attorney, Agent, or Firm* — ScienBiziP, P.C.

(57) ABSTRACT

A method for dividing an image obtains the image by captured and a depth map of the image. The method creates a histogram of the depth map including horizontal and vertical axes. A clustering algorithm is applied to the data in the histogram to determine upon two data clusters and the cluster centers of the two clusters. The method determines that the abscissa value of the smallest ordinate value between two cluster centers in the histogram is a segmentation threshold. If the obtained segmentation threshold meets a preset condition, the image is segmented into a foreground region and a background region. An electronic device for applying the method is also provided.

16 Claims, 6 Drawing Sheets

ELECTRONIC DEVICE AND METHOD FOR SEGMENTING IMAGE

FIELD

The subject matter herein generally relates to digital image processing.

BACKGROUND

A process to divide an image into a foreground region and a background region is needed before a post-processing of the image such as a background dimming processing. However, known methods segmenting the image into the foreground region and the background region at a position where the depth in an image are continuously distributed, which may cause the foreground region and the background region to be segmented improperly and adversely affect the post-processing of the image.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
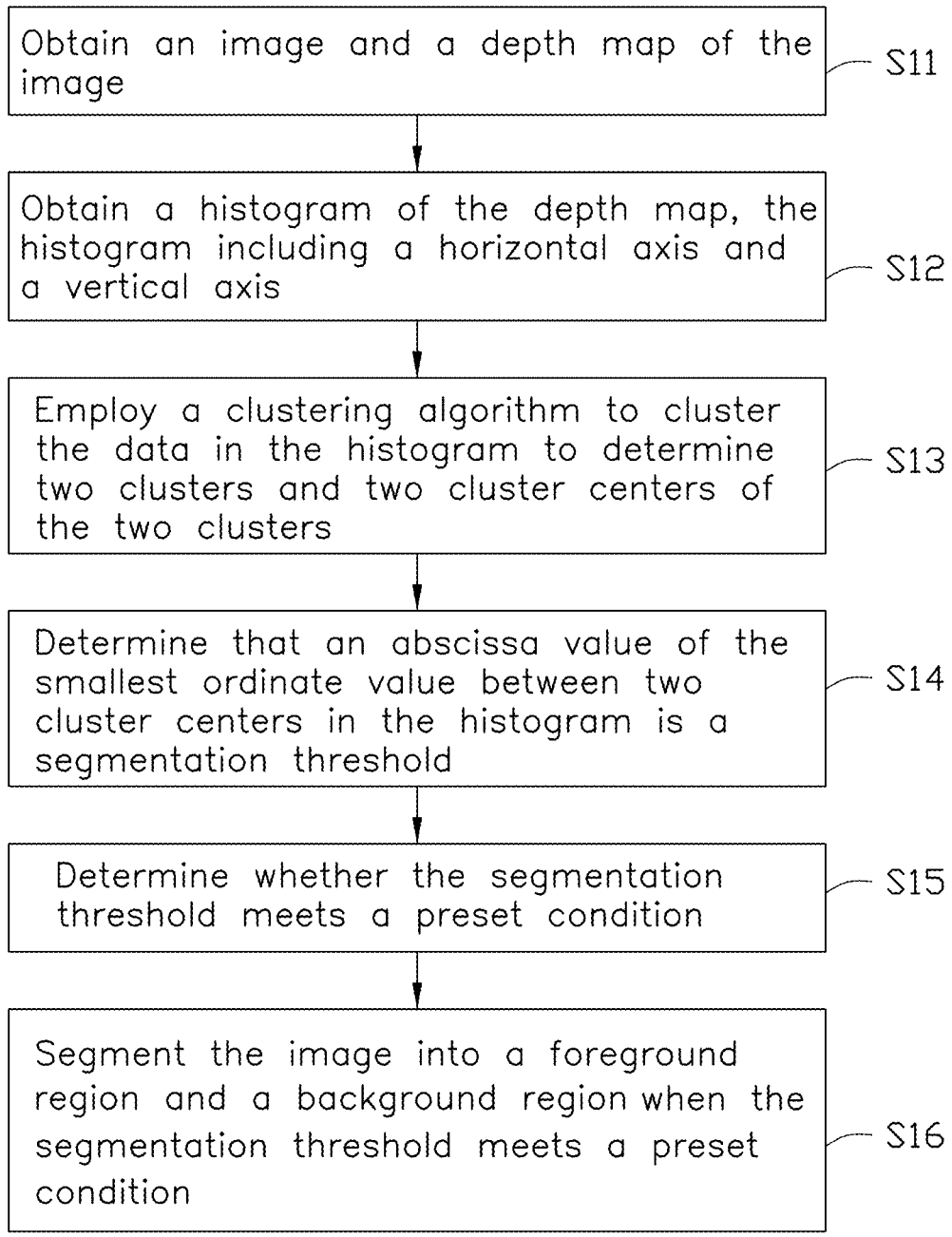
FIG. 1 illustrates a flowchart of a first embodiment of a method for segmenting an image.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

FIG. 1 illustrates a flowchart of a method for segmenting an image in a first embodiment. The illustrated order of blocks is illustrative only and the order of the blocks can be changed. Additional blocks can be added or fewer blocks can be utilized without departing from this disclosure. The method can be applied in an electronic device. The electronic device can be any suitable electronic device, for example, a personal computer, a tablet computer, a mobile phone, a personal digital assistant (PDA), or the like. The example method can begin at block S11.

At block S11, obtaining an image and a depth map of the image.

Obtaining an image and a depth map of the image includes obtaining an image captured by a capturing device, and obtaining a depth map of the image by using a binocular matching algorithm. In the embodiment, the capturing device can capture images which are 3D images.

Obtaining an image and a depth map of the image includes obtaining an image and a depth map of the image using a capturing device. In the embodiment, the capturing device can be a depth map capturing device. The depth map capturing device can directly capture the image and the depth map of the image. In the embodiment, the depth map capturing device can be a Microsoft KINECT camera. In other embodiments, the depth map capturing device can be for example PRIMESENSE by Apple, or the like.

The depth map can be a monochrome image. The size of the depth map can be the same as the size of the image. The grayscale values of the depth map can be a depth value of the pixels of the image. The depth value is the distance between an object captured in the image and the plane of the capturing device.

At block S12, obtaining a histogram of the depth map, the histogram including a horizontal axis and a vertical axis.

In the embodiment, before obtaining a histogram of the depth map, the method further includes processing the depth map to eliminate noise. The processing can be image smoothing process. In the embodiment, the image smoothing processing can be a neighborhood average method, a median filtering method, or the like.

Figure 2:
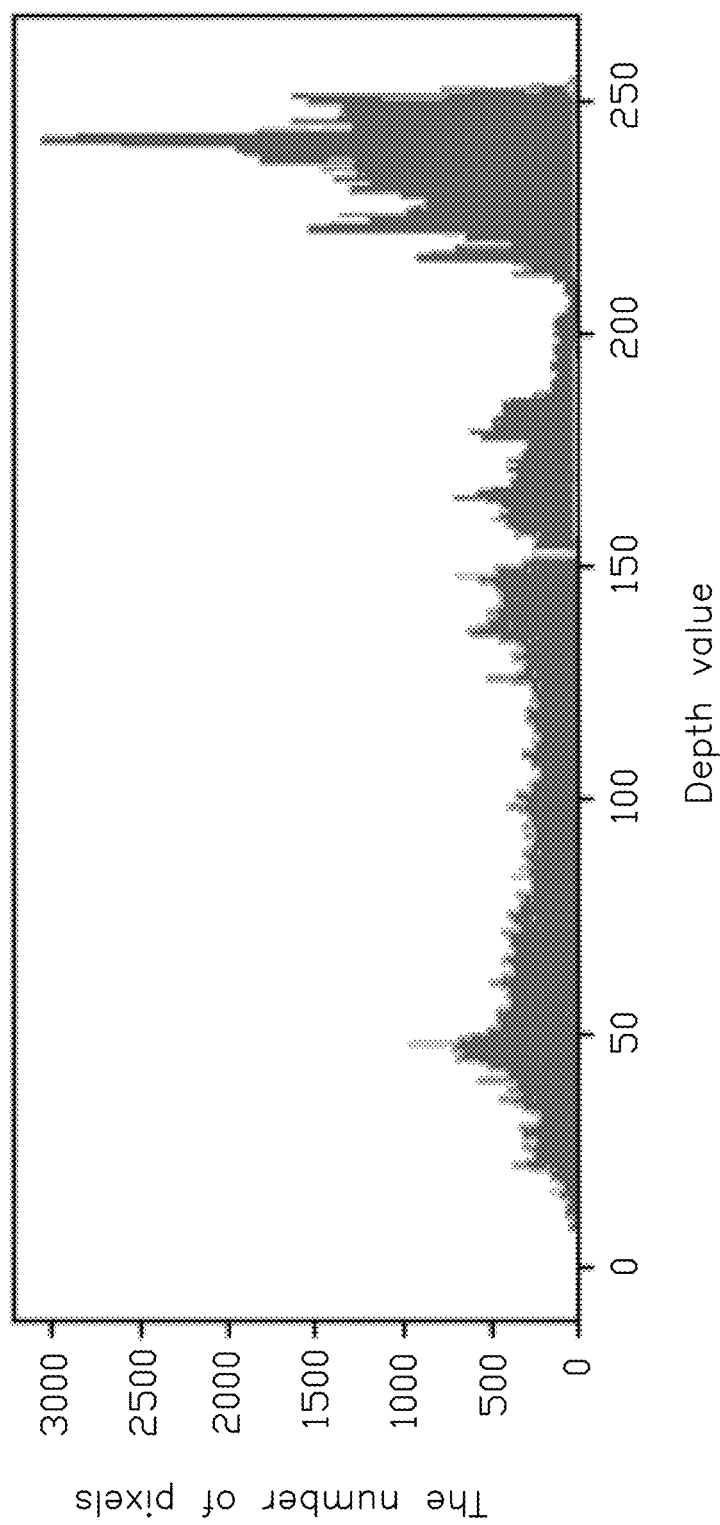
FIG. 2 illustrates a histogram of an embodiment of a depth map in the method of FIG. 1.

In the embodiment, the histogram can be a depth histogram. In the embodiment, the histogram represents the number of pixels with depth values in a depth map, as shown in FIG. 2. In detail, the horizontal axis of the histogram can represent the depth value of each pixel of the depth map, and the vertical axis of the histogram can represent the number of the pixels with the depth values. In the embodiment, a range of the depth values is [0, 255], and a range of the number of the pixels is [0, 3000].

At block S13, employing a clustering algorithm to cluster the data in the histogram to determine two clusters and two cluster centers of the two clusters.

In the embodiment, the clustering algorithm can be a K-means algorithm. The K-means algorithm can be any known K-means algorithm. A typical K-means algorithm will be described, other known K-means algorithms will not be described. The K-means algorithm can include:

a1: choosing K dots in the data of the histogram as initial cluster centers in the two clusters, K can be an integer greater than one.

a2: scanning all the data of the histogram, calculating the distance from each dot of the data of the histogram to each initial cluster center, and clustering the dots in the histogram into K parts based on the smallest distance from dots to the initial cluster centers. For example, dots closer to a cluster center A belong to A cluster and dots closer to a cluster center B belong to B cluster.

a3: recalculating new cluster center of each cluster.

a4: stopping the K-means algorithm when iterates through a preset number, or when a new cluster center is the same as a previous cluster center, or when a distance between the new cluster center and the previous cluster center is less than a preset threshold. In the embodiment, K=2, the preset number is equal to ten iterations, and the preset threshold is equal to 0.1 depth value.

In other embodiments, the clustering algorithm can be a kernel density estimation algorithm, or the like. The kernel density estimation algorithm can be any known kernel density estimation algorithm. The kernel density estimation algorithm is well known in the art.

Figure 3:
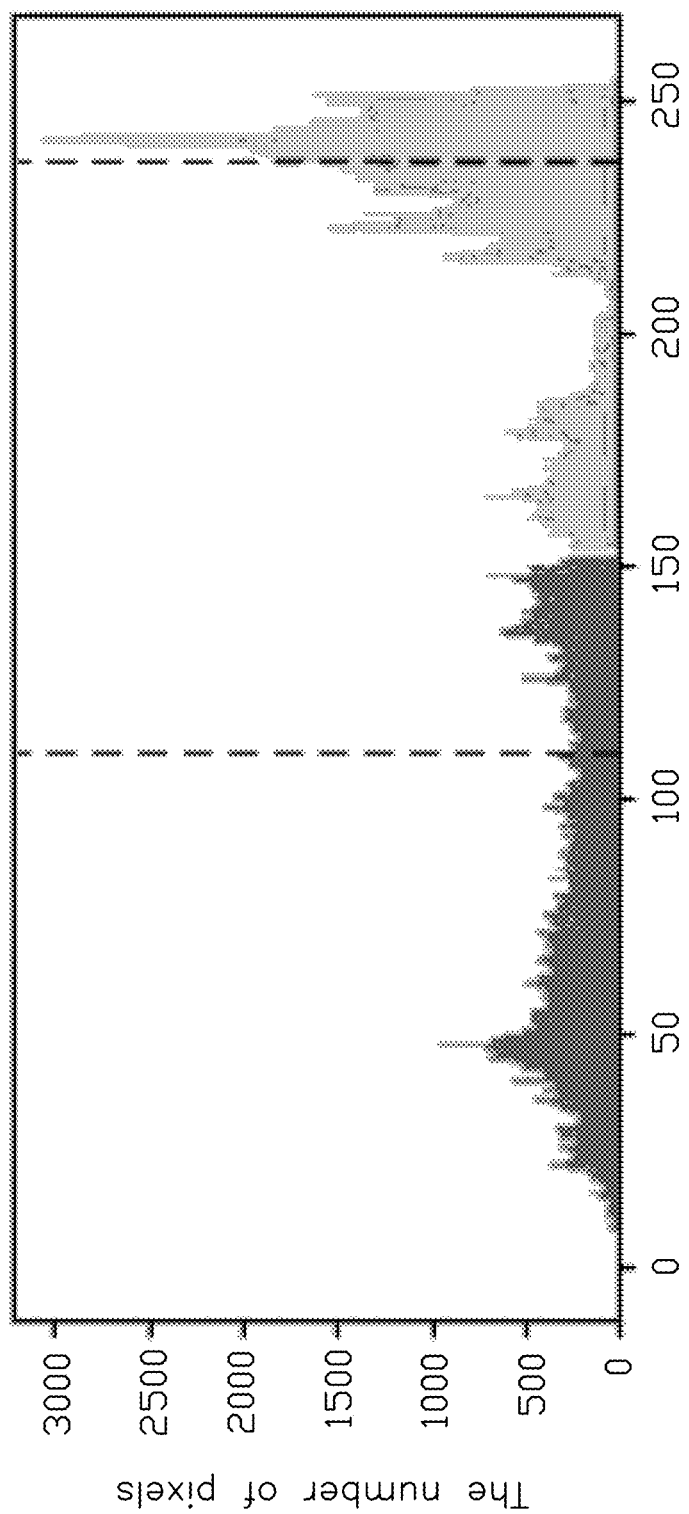
FIG. 3 illustrates a view of cluster centers in the histogram of the method of FIG. 1.

In the embodiment, after the clustering algorithm is applied, two clusters and two cluster centers are determined. In the embodiment, following the example of the histogram shown in FIG. 2, two clusters are represented by two different grayscale values showing difference shades, as shown in FIG. 3. The abscissa values of the two cluster centers are 106.19 and 236.28, shown with dashed line in FIG. 3.

At block S14, determining that an abscissa value of the smallest ordinate value between two cluster centers in the histogram is a segmentation threshold.

Figure 4:
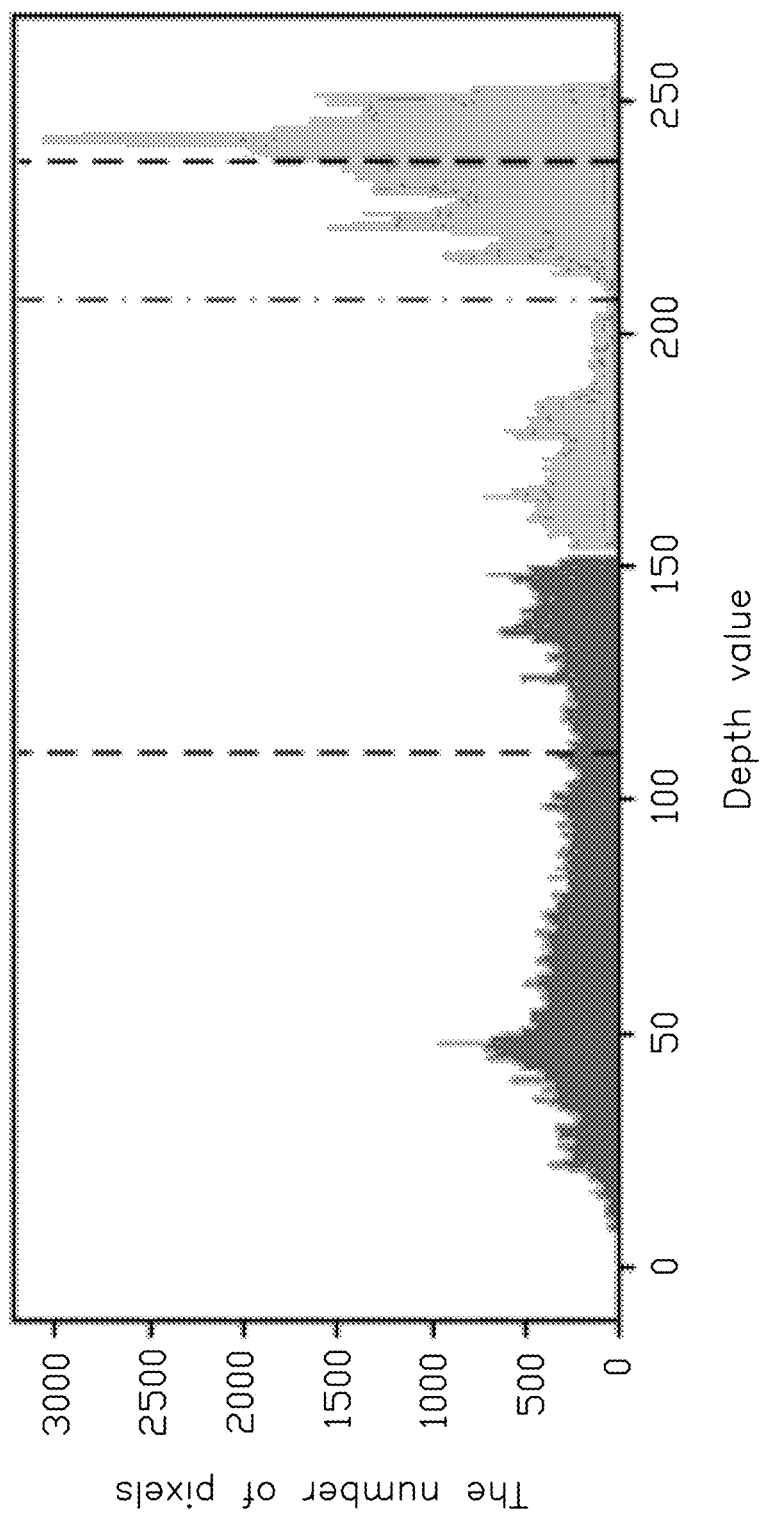
FIG. 4 illustrates a view of cluster centers and a segmentation threshold in the histogram of the method of FIG. 1.

For example, the abscissa value with the smallest ordinate value between the abscissa values 106.19 and 236.28 in the histogram can be 206. It is thus determined that 206 is the segmentation threshold shown with dot-and-dash line in FIG. 4.

In the embodiment, the foreground region will usually be the object closer the capturing device, the background region will usually be the object further away from the capturing device. The distance between the foreground region and the capturing device and the distance between the background region and the capturing device are different, thus the foreground region and the background region in the depth map are not continuously distributed in depth. The segmentation threshold is thus between two cluster centers where the image is not continuously distributed in depth, to achieve an effective segmentation of the image into foreground and background regions.

At block S15, determining whether the segmentation threshold meets a preset condition.

The preset condition can be that an average value of the ordinate values in a preset range around the segmentation threshold in the histogram is less than a first preset value. In the embodiment, the preset range can be a range where abscissa values are in a range from T-N to T+N. T is the segmentation threshold. N can be any positive integer, for example, N can be equal to two. The first preset value can be 50~200, for example, and the first preset value can be equal to 100. Number N and the first preset value are not limited to the aforementioned values, and can be any suitable value according to the need.

The preset condition can be that the ordinate value corresponding to the segmentation threshold is less than a second preset value. The second preset value can be 50~200, for example, and the second preset value can be equal to 100. The second preset value is not limited to being the aforementioned value.

At block S16, segmenting the image into the foreground region and the background region when the segmentation threshold meets a preset condition.

The preset condition can be that an average value of the ordinate values in a preset range around the segmentation threshold in the histogram is less than a first preset value, or that the ordinate value corresponding to the segmentation threshold is less than a second preset value. In the embodiment, the fact of the segment threshold meeting a preset condition represents that a clear boundary exists between the foreground region and the background region, thus the image can be segmented into the foreground region and the background region. In detail, the pixels in the image which have depth value less than the segmentation threshold can be segmented into the foreground region, and the pixels in the image which have depth value greater than the segmentation threshold can be segmented into the background region. The pixels in the image which have depth value equal to the segmentation threshold can be segmented into the foreground region or the background region. In the embodiment, after the image is segmented into the foreground region and the background region, the image can be post processed, for example, the background dimmed or otherwise altered, to achieve various functions.

The method of the first embodiment obtains an image and a depth map of the image, and obtains a histogram of the depth map. The histogram includes a horizontal axis and a vertical axis. The method further employs a clustering algorithm to cluster the data in the histogram to determine two clusters and two cluster centers of the two clusters, determine that the abscissa value with the smallest ordinate value between the two cluster centers in the histogram is the segmentation threshold, and if the segmentation threshold meets a preset condition, segment the image into the foreground region and the background region. Thus, the segmentation threshold locates where the image is not continuously distributed in depth, the segmentation of the image into the foreground region and the background region in this way is proper. Also, the image is segmented into the foreground region and the background region when the boundary between the foreground region and the background region is clear, further efficiently segment the image into the foreground region and the background region.

Figure 5:
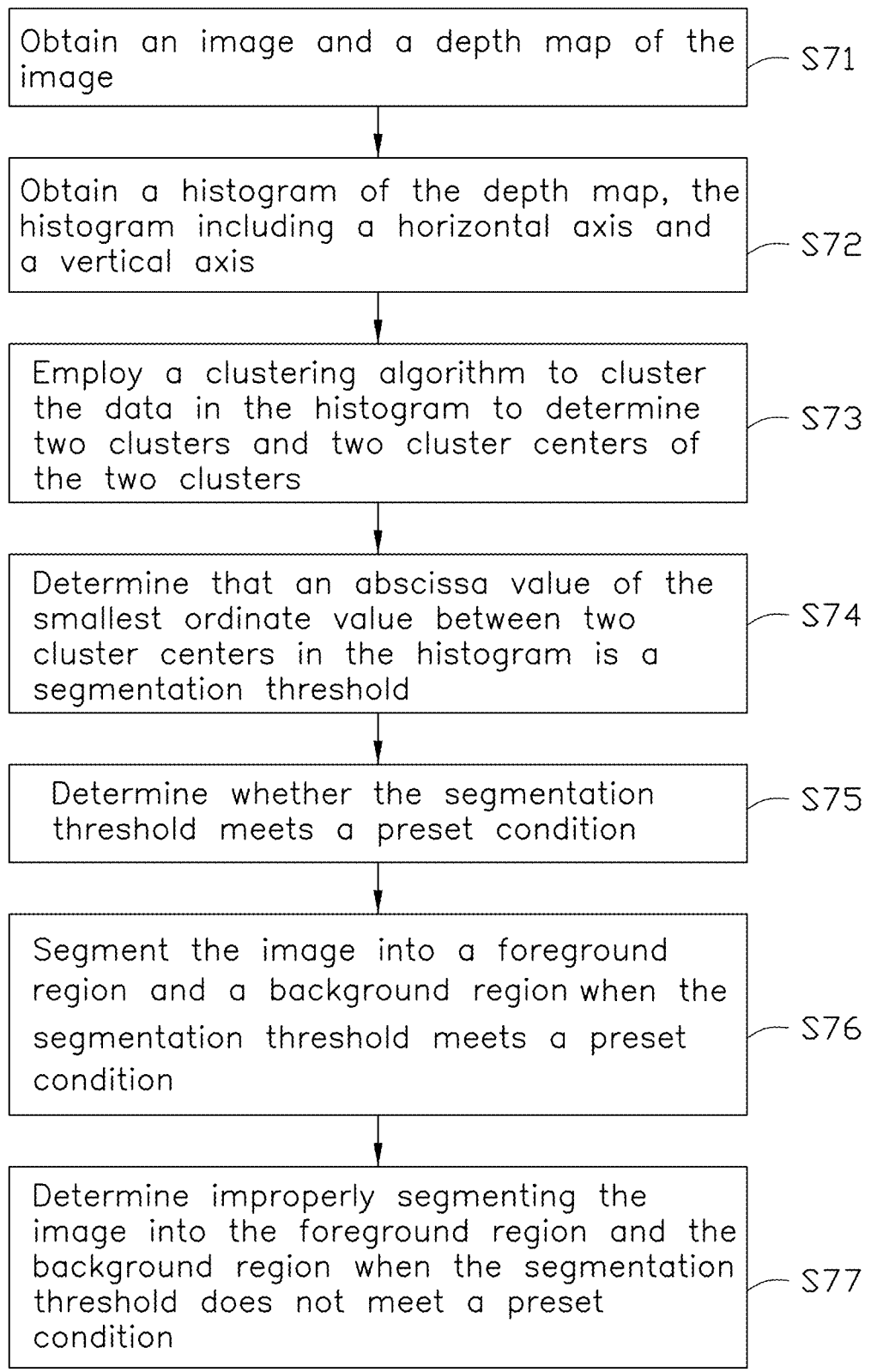
FIG. 5 illustrates a flowchart of a second embodiment of a method for segmenting an image.

FIG. 5 illustrates a flowchart of a method for segmenting an image a second embodiment. The illustrated order of blocks is illustrative only and the order of the blocks can be changed. Additional blocks can be added or fewer blocks can be utilized without departing from this disclosure. The method can be applied in an electronic device. The electronic device can be any suitable electronic device, for example, a personal computer, a tablet computer, a mobile phone, a PDA, or the like. The example method can begin at block S71.

At block S71, obtaining an image and a depth map of the image.

The block S71 of the second embodiment is the same as the block S11 of the first embodiment, the detail can refer to the related description of the block S11 of the first embodiment, which will not be described herein.

At block S72, obtaining a histogram of the depth map, the histogram including a horizontal axis and a vertical axis.

The block S72 of the second embodiment is the same as the block S12 of the first embodiment, the detail can refer to the related description of the block S12 of the first embodiment, which will not be described herein.

At block S73, employing a clustering algorithm to cluster the data in the histogram to determine two clusters and two cluster centers of the two clusters.

The block S73 of the second embodiment is the same as the block S13 of the first embodiment, the detail can refer to the related description of the block S13 of the first embodiment, which will not be described herein.

At block S74, determining that an abscissa value of the smallest ordinate value between two cluster centers in the histogram is a segmentation threshold.

The block S74 of the second embodiment is the same as the block S14 of the first embodiment, the detail can refer to the related description of the block S14 of the first embodiment, which will not be described herein.

At block S75, determining whether the segmentation threshold meets a preset condition.

The block S75 of the second embodiment is the same as the block S15 of the first embodiment, the detail can refer to the related description of the block S15 of the first embodiment, which will not be described herein.

At block S76, segmenting the image into the foreground region and the background region when the segmentation threshold meets a preset condition.

The block S76 of the second embodiment is the same as the block S16 of the first embodiment, the detail can refer to the related description of the block S16 of the first embodiment, which will not be described herein.

At block S77, determining improperly segmenting the image into the foreground region and the background region when the segmentation threshold does not meet a preset condition.

The segmentation threshold does not meet a preset condition can be that an average value of the ordinate values in a preset range around the segmentation threshold in the histogram is greater than or equal to a first preset value or that the ordinate value corresponding to the segmentation threshold is greater than or equal to a second preset value.

In the embodiment, the fact of the segment threshold does not meet a preset condition can represent that there is not a clear boundary between the foreground region and the background region, thus the image is improperly segmented into the foreground region and the background region, therefore giving up segmenting the image.

The method of the second embodiment obtains an image and a depth map of the image, and obtains a histogram of the depth map. The histogram includes a horizontal axis and a vertical axis. The method further employs a clustering algorithm to cluster the data in the histogram to determine two clusters and two cluster centers of the two clusters, determine that the abscissa value with the smallest ordinate value between the two cluster centers in the histogram is the segmentation threshold, if the segmentation threshold meets a preset condition, segment the image into the foreground region and the background region, and if the segmentation threshold does not meet a preset condition determining improperly segmenting the image into the foreground region and the background region. Thus, the segmentation threshold locates where the image is not continuously distributed in depth, and the segmentation of the image into the foreground region and the background region in this way is proper. Also, the image is segmented into the foreground region and the background region when the boundary between the foreground region and the background region is clear, further efficiently segment the image into the foreground region and the background region. Simultaneously, give up segmenting the image when the boundary between the foreground region and the background region is unclear, avoiding the improperly segmentation of the image.

Figure 6:
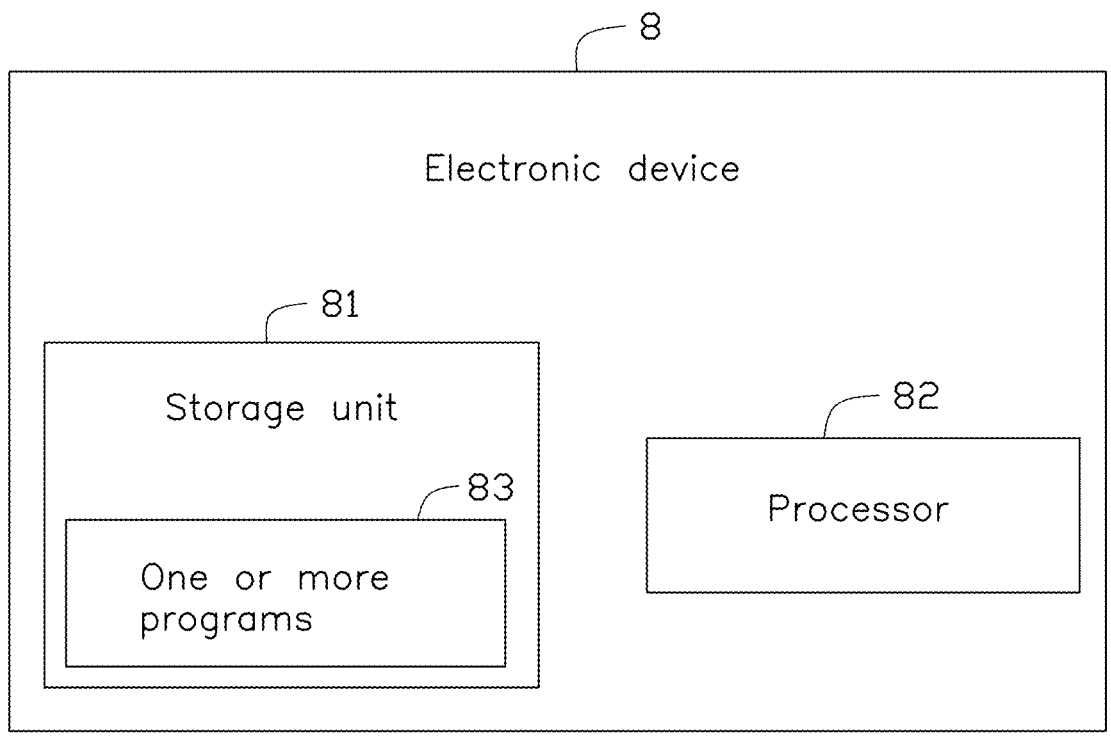
FIG. 6 illustrates a block diagram of a third embodiment of an electronic device.

FIG. 6 illustrates an electronic device in an embodiment.

The electronic device 1 can include a storage unit 81, at least one processor 82, and one or more programs 83 stored in the storage unit 81 and can be run on the at least one processor 82. The at least one processor 82 can execute the one or more programs 83 to accomplish the steps of the exemplary method for segmenting an image.

The one or more programs 83 can be divided into one or more modules/units. The one or more modules/units can be stored in the storage unit 81 and executed by the at least one processor 82 to accomplish the object of the present disclosure. The one or more modules/units can be a series of program instruction segments which can perform specific functions, and the instruction segment is configured to describe the execution process of the one or more programs 83 in the electronic device 8.

The electronic device 8 can be any suitable electronic device, for example, a personal computer, a tablet computer, a mobile phone, a PDA, or the like. A person skilled in the art knows that the device in FIG. 6 is only an example, and does not be considered as limiting of the electronic device 8, the electronic device 8 may include more or fewer parts than the diagram, or combine of certain parts, or includes different parts, such as the electronic device 8 can also include one or more input and output devices, one or more network access devices, one or more display device, and so on.

The at least one processor 82 can be one or more central processing units, or it can be one or more other universal processors, digital signal processors, application specific integrated circuits, field-programmable gate arrays, or other programmable logic devices, discrete gate or transistor logic, discrete hardware components, and so on. The at least one processor 82 can be a microprocessor or the at least one processor 82 can be any regular processor, or the like. The at least one processor 82 can be a control center of the electronic device 8, using a variety of interfaces and lines to connect various parts of the entire electronic device 8.

The storage unit 81 stores the one or more programs and/or modules/units. The at least one processor 82 can run or execute the one or more programs and/or modules/units stored in the storage unit 81, call out the data stored in the storage unit 81, and accomplish the various functions of the electronic device 8, for example apply the methods hereinbefore described. The storage unit 81 may include a program area and a data area. The program area can store an operating system, and applications that are required for the at least one function, such as sound playback features, images playback functions, and so on. The data area can store data created according to the use of the electronic device 8, such as video data, audio data, photobook data, and so on. In addition, the storage unit 81 can include high-speed random access memory and non-transitory storage medium, such as hard disk, memory, plug-in hard disk, smart media card, secure digital, flash card, at least one disk storage device, flash memory, or other transitory storage medium.

If the integrated module/unit of the electronic device 8 is implemented in the form of or by means of a software functional unit and is an independent product sold or used, all parts of the integrated module/unit of the electronic device 8 may be stored in a computer-readable storage medium. The electronic device 8 can use one or more programs to control the related hardware to accomplish all parts of the methods of this disclosure. The one or more programs can be stored in a computer-readable storage medium. The one or more programs can be accomplish the block of the exemplary method when executing by the at least one processor. The one or more stored programs can include program code. The program code can be in the form of source code, object code, executable code file, or in some intermediate form. The computer-readable storage medium may include any entity or device capable of recording and carrying the program codes, recording media, USB flash disk, mobile hard disk, disk, computer-readable storage medium, read-only memory, Random access memory, electrical carrier signals, telecommunications signals, and software distribution package. The content stored in the computer-readable storage medium can be increased or decreased in accordance with legislative requirements and regulations of patent practice jurisdictions, for example, in some jurisdictions, legislation and patent practice stipulates that computer-readable storage medium does not include electrical carrier signals or telecommunications signals.

In the present disclosure, it should be understood that the disclosed methods and electronic devices can be employed or achieved in other ways. The electronic device exemplified is only illustrative.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for segmenting an image, comprising:
obtaining an image and a depth map of the image;
obtaining a histogram of the depth map, the histogram including a horizontal axis and a vertical axis;
employing a clustering algorithm to cluster the data in the histogram to determine two clusters and two cluster centers of the two clusters;
determining that an abscissa value of the smallest ordinate value between two cluster centers in the histogram is a segmentation threshold;
determining whether the segmentation threshold meets a preset condition; and
segmenting the image into a foreground region and a background region when the segmentation threshold meets a preset condition.

2. The method according to claim 1, wherein obtaining an image and a depth map of the image comprises:
obtaining an image captured by a capturing device, and obtaining a depth map of the image by using a binocular matching algorithm.

3. The method according to claim 1, wherein obtaining an image and a depth map of the image comprises:
obtaining an image and a depth map of the image via a depth map capturing device.

4. The method according to claim 1, wherein:
the preset condition is that an average value of the ordinate values in a preset range around the segmentation threshold in the histogram is less than a first preset value.

5. The method according to claim 1, wherein:
the preset condition is that the ordinate value corresponding to the segmentation threshold is less than a second preset value.

6. The method according to claim 1, wherein the method further comprises:
determining improperly segmenting the image into the foreground region and the background region when the segmentation threshold does not meet a preset condition.

7. The method according to claim 1, wherein:
the horizontal axis of the histogram represents the depth value of each pixel of the depth map, and the vertical axis of the histogram represents the number of the pixels with the depth values.

8. The method according to claim 1, wherein:
the clustering algorithm is a K-means algorithm.

9. An electronic device comprising:
a storage device;
at least one processor; and
the storage device storing one or more programs, which when executed by the at least one processor, cause the at least one processor to:
obtain an image and a depth map of the image;
obtain a histogram of the depth map, the histogram including a horizontal axis and a vertical axis;
employ a clustering algorithm to cluster the data in the histogram to determine two clusters and two cluster centers of the two clusters;
determine that an abscissa value of the smallest ordinate value between two cluster centers in the histogram is a segmentation threshold;
determine whether the segmentation threshold meets a preset condition; and
segment the image into a foreground region and a background region when the segmentation threshold meets a preset condition.

10. The electronic device according to claim 9, wherein obtaining an image and a depth map of the image comprises:
obtaining an image captured by a capturing device, and obtaining a depth map of the image by using a binocular matching algorithm.

11. The electronic device according to claim 9, wherein obtaining an image and a depth map of the image comprises:
obtaining an image and a depth map of the image via a depth map capturing device.

12. The electronic device according to claim 9, wherein:
the preset condition is that an average value of the ordinate values in a preset range around the segmentation threshold in the histogram is less than a first preset value.

13. The electronic device according to claim 9, wherein:
the preset condition is that the ordinate value corresponding to the segmentation threshold is less than a second preset value.

14. The electronic device according to claim 9, wherein causing the at least one processor to further:
determining improperly segmenting the image into the foreground region and the background region when the segmentation threshold does not meet a preset condition.

15. The electronic device according to claim 9, wherein:
the horizontal axis of the histogram represents the depth value of each pixel of the depth map, and the vertical axis of the histogram represents the number of the pixels with the depth values.

16. The electronic device according to claim 9, wherein:
the clustering algorithm is a K-means algorithm.

* * * * *